US008428266B2

(12) United States Patent
Jiang et al.

(10) Patent No.: US 8,428,266 B2
(45) Date of Patent: Apr. 23, 2013

(54) METHOD AND TERMINAL FOR IMPLEMENTING HOT-PLUG OF SMART CARD

(75) Inventors: Chengzhi Jiang, Shenzhen (CN); Weimei Yin, Shenzhen (CN); Chuanhui Wang, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 0 days.

(21) Appl. No.: 13/509,052

(22) PCT Filed: May 25, 2010

(86) PCT No.: PCT/CN2010/073186
§ 371 (c)(1),
(2), (4) Date: May 10, 2012

(87) PCT Pub. No.: WO2010/148880
PCT Pub. Date: Dec. 29, 2010

(65) Prior Publication Data
US 2012/0224697 A1  Sep. 6, 2012

(30) Foreign Application Priority Data

Nov. 23, 2009 (CN) .......................... 2009 1 0222634

(51) Int. Cl.
*H04L 9/00* (2006.01)
*G06F 21/24* (2006.01)
(52) U.S. Cl.
USPC ........... 380/277; 380/278; 380/247; 380/287; 713/171; 713/182; 713/185; 713/192; 726/20; 726/26; 709/231
(58) Field of Classification Search .......... 380/277–278, 380/247, 287; 713/171, 182, 185, 193; 726/20, 726/26; 709/231
See application file for complete search history.

(56) References Cited

U.S. PATENT DOCUMENTS

| 8,317,096 | B2 * | 11/2012 | Mysore | ......................... 235/382 |
| 2005/0120125 | A1 * | 6/2005 | Morten et al. | ................. 709/231 |
| 2005/0234832 | A1 * | 10/2005 | Kanai | .............................. 705/57 |
| 2007/0121940 | A1 * | 5/2007 | Park et al. | ...................... 380/201 |

FOREIGN PATENT DOCUMENTS

| CN | 1678054 A | 10/2005 |
| CN | 1756146 A | 4/2006 |
| CN | 1946166 A | 4/2007 |
| CN | 101110671 A | 1/2008 |
| CN | 101383672 A | 3/2009 |
| CN | 101577561 A | 11/2009 |

OTHER PUBLICATIONS

International Search Report for PCT/CN2010/073186 dated Jul. 29, 2010.

* cited by examiner

*Primary Examiner* — Andrew L Nalven
*Assistant Examiner* — Amir Mehrmanesh
(74) *Attorney, Agent, or Firm* — Ling Wu; Stephen Yang; Ling and Yang Intellectual Property

(57) ABSTRACT

A method and terminal for implementing hot-plug of a smart card are disclosed. The method includes: during the process of playing mobile multimedia, a descrambling library sending request information for obtaining a program key to a smart card driving module, which judges whether a smart card is in a plug-in state or a pull-out state after receiving the request information: if in the plug-in state, the smart card driving module forwarding the request information to the smart card, receiving response information returned by the smart card, forwarding the response information to the descrambling library, and meanwhile forwarding the response information to a virtual smart card module to save; if in the pull-out state, the smart card driving module forwarding the request information to the virtual smart card module, which returns the saved response information to the smart card driving module, which forwards the response information to the descrambling library.

12 Claims, 2 Drawing Sheets

METHOD AND TERMINAL FOR IMPLEMENTING HOT-PLUG OF SMART CARD

TECHNICAL FIELD

The present invention relates to mobile multimedia, and particularly, to a method and terminal for implementing hot-plug.

BACKGROUND OF THE RELATED ART

Currently, the China Mobile Multimedia Broadcasting (CMMB) service is gradually promoted in the whole country. With the maturity of the technology, many cities have encrypted mobile multimedia programs.

The State Administration of Radio Film and Television has launched a charging scheme recently, and the charging scheme uses a smart card to perform decryption. If the smart card is required to be used, a corresponding descrambling library needs to be adopted. A whole framework for implementing the scheme on the terminal is as shown in FIG. 1, wherein, after receiving an encrypted program code stream from the radio and television network, a program receiving module sends the encrypted program code stream to a data processing module;

the data processing module packages the encrypted code stream to send to the descrambling library;

the descrambling library acquires a program key by a smart card driving module interacting with the smart card for multiple times, and descrambles the encrypted code stream into a clear stream through the program key to send to a playing module, the program key has a certain survival time, and the descrambling library needs to acquire a new program key again by the smart card driving module interacting with the smart card after the program key is invalid;

after receiving the clear-stream programs, the playing module plays the clear-stream programs.

SUMMARY OF THE INVENTION

The defect of the above system is that, after a user pulls out a smart card, and when a descrambling library sends information through a smart card driving module and does not receive response information of the smart card, the descrambling library will perform a deadlock, which causes that the user can not play mobile multimedia programs again after plugging in the smart card and have to re-start a terminal.

The technical problem required to be solved by the present invention is to provide a method and terminal for implementing hot-plug.

In order to solve the above technical problem, the present invention provides a method for implementing hot-plug, which is applied to a terminal comprising a descrambling library, a smart card driving module, a smart card and a virtual smart card module, and the method comprises:

during a process of playing mobile multimedia, the descrambling library sending request information for obtaining a program key to the smart card driving module, and the smart card driving module judging whether the smart card is in a plug-in state or a pull-out state after receiving the request information for obtaining the program key:

if the smart card is in the plug-in state, the smart card driving module forwarding the request information to the smart card, receiving response information returned by the smart card, forwarding the response information to the descrambling library, and meanwhile forwarding the response information to the virtual smart card module to save; if the smart card is in the pull-out state, the smart card driving module forwarding the request information to the virtual smart card module, the virtual smart card module returning the saved response information to the smart card driving module, and the smart card driving module forwarding the response information to the descrambling library, thereby implementing hot-plug of the smart card when the mobile multimedia is played.

Before the step of judging whether the smart card is in a plug-in state or a pull-out state, the method further comprises: the smart card driving module detecting whether the smart card is in the plug-in state or pull-out state in real time and performing recording;

the step of judging whether the smart card is in a plug-in state or a pull-out state comprises: after receiving the request information, the smart card driving module judging whether the smart card is in the plug-in state or pull-out state according to the recorded information.

After the step of the descrambling library sending request information for obtaining a program key to the smart card driving module, the method further comprises: if not receiving the response information of the request information for obtaining the program key, the descrambling library performing a deadlock; after the step of forwarding the response information to the descrambling library, the method further comprises: the descrambling library acquiring the program key from the response information and descrambling the encrypted code stream.

After the step of the smart card driving module forwarding the request information to the virtual smart card module, the method further comprises: after the virtual smart card module receives the response information forwarded by the smart card driving module, if the virtual smart card module has not saved any response information, saving the response information, if response information has been saved in local, updating the originally saved response information.

The method is applied to a playing process of the terminal playing the China Mobile Multimedia Broadcasting (CMMB) programs.

The present invention further provides a terminal supporting hot-plug, which comprises a descrambling library, a smart card driving module, a smart card and a virtual smart card module, wherein:

the descrambling library is configured to: send request information for obtaining a program key to the smart card driving module, receive response information sent by the smart card driving module to obtain the program key, and descramble an encrypted code scream;

the smart card driving module is configured to: after receiving the request information for obtaining the program key sent by the descrambling library, judge whether the smart card is in a plug-in state or a pull-out state, if the smart card is in the plug-in state, forward the request information to the smart card, forward the response information returned by the smart card to the descrambling library, and meanwhile forward the response information returned by the smart card to the virtual smart card module to save; if the smart card is in the pull-out state, forward the request information to the virtual smart card module, and forward the response information returned by the virtual smart card module to the descrambling library; and the virtual smart card module is configured to: after receiving the response information forwarded by the smart card driving module, save or update the response information, and after receiving the request information forwarded by the smart card driving module, return the saved response information to the smart card driving module, thereby supporting hot-plug of the smart card when mobile multimedia is played.

The smart card driving module is further configured to: detect whether the smart card is in the plug-in state or pull-out state in real time and perform recording; and the smart card driving module is configured to judge whether the smart card is in the plug-in state or pull-out state according to the recorded information.

The descrambling library is further configured to: after sending the request information for obtaining the program key, perform a deadlock if the response information is not received.

The descrambling library is further configured to: send the request information for obtaining the program key in the playing process of the terminal playing China Mobile Multimedia Broadcasting (CMMB) programs.

In the above scheme, the descrambling library is prevented from deadlocking by sending the saved response information of the smart card to the descrambling library, so as to implement the purpose of hot-plug of the smart card which does not require to restart the terminal after the user plugs in the smart card again.

PREFERRED EMBODIMENTS OF THE PRESENT INVENTION

The technical scheme of the present invention will be described in detail in combination with the accompanying drawings and examples below.

Figure 1:
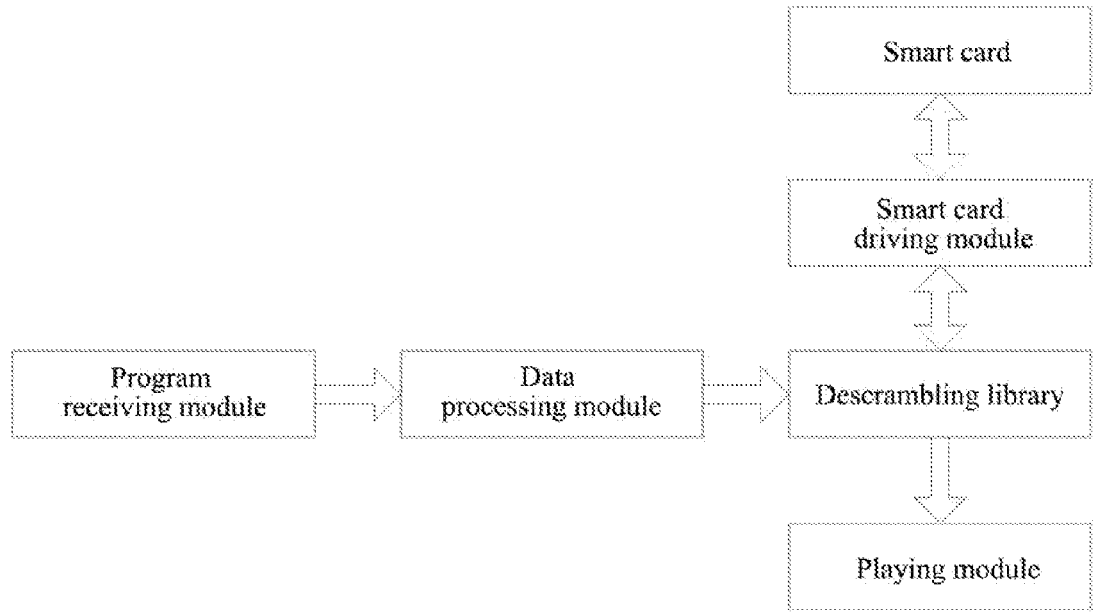
FIG. 1 is an architecture diagram of the whole scheme according to the prior art.
Figure 2:
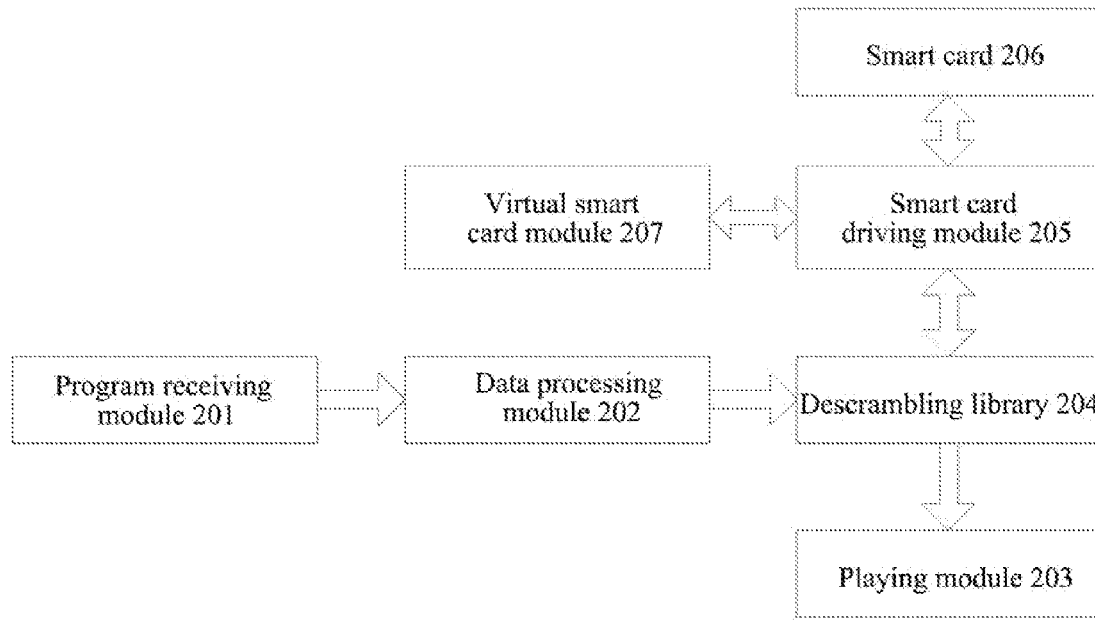
FIG. 2 is an architecture diagram of the device according to the embodiment of the present invention.

As shown in FIG. 2, the embodiment takes the playing of CMMB as an example, a terminal supporting hot-plug of a smart card comprises the following modules: a program receiving module 201, a data processing module 202, a playing module 203, a descrambling library 204, a smart card driving module 205, a smart card 206 and a virtual smart card module 207. Wherein, functions of the program receiving module 201, data processing module 202, playing module 203, descrambling library 204 and smart card 206 are the same as the functions of corresponding modules in FIG. 1. Wherein:

the descrambling library 204 is configured to: send request information for obtaining a program key to the smart card driving module 205, receive response information sent by the smart card driving module 205 to obtain the program key, and descramble an encrypted code scream;

the smart card driving module 205 is configured to: after receiving the request information for obtaining the program key sent by the descrambling library 204, judge whether the smart card 206 is in a plug-in state or a pull-out state, if the smart card is in the plug-in state, forward the request information to the smart card 206, forward the response information returned by the smart card 206 to the descrambling library 204, and meanwhile forward the response information returned by the smart card 206 to the virtual smart card module 207 to save; if the smart card is in the pull-out state, forward the request information to the virtual smart card module 207, and forward the response information returned by the virtual smart card module 207 to the descrambling library 204.

The smart card 204 is configured to: receive the request information sent by the smart card driving module 205 to perform processing, and return the response information to the smart card driving module 205;

the virtual smart card module 207 is configured to: save the response information sent by the smart card driving module 205, and when receiving the request information sent by the smart card driving module 205, return the saved response information to the smart card driving module 205; specifically, after the response information forwarded by the smart card driving module 205 is received, if no response information has been saved in local, save the response information, and if there is response information which has been saved in local, update the originally saved response information.

In the embodiment, the smart card driving module 205 detects and records a plug state of the smart card in real time. When the smart card is plugged in, the smart card driving module 205 initializes the smart card 206, after the smart card 206 reaches an available state, the state of the smart card 206 is modified to be plug-in state, when the smart card 206 is pulled out, the state of the smart card 206 is modified to be pull-out state.

Figure 3:
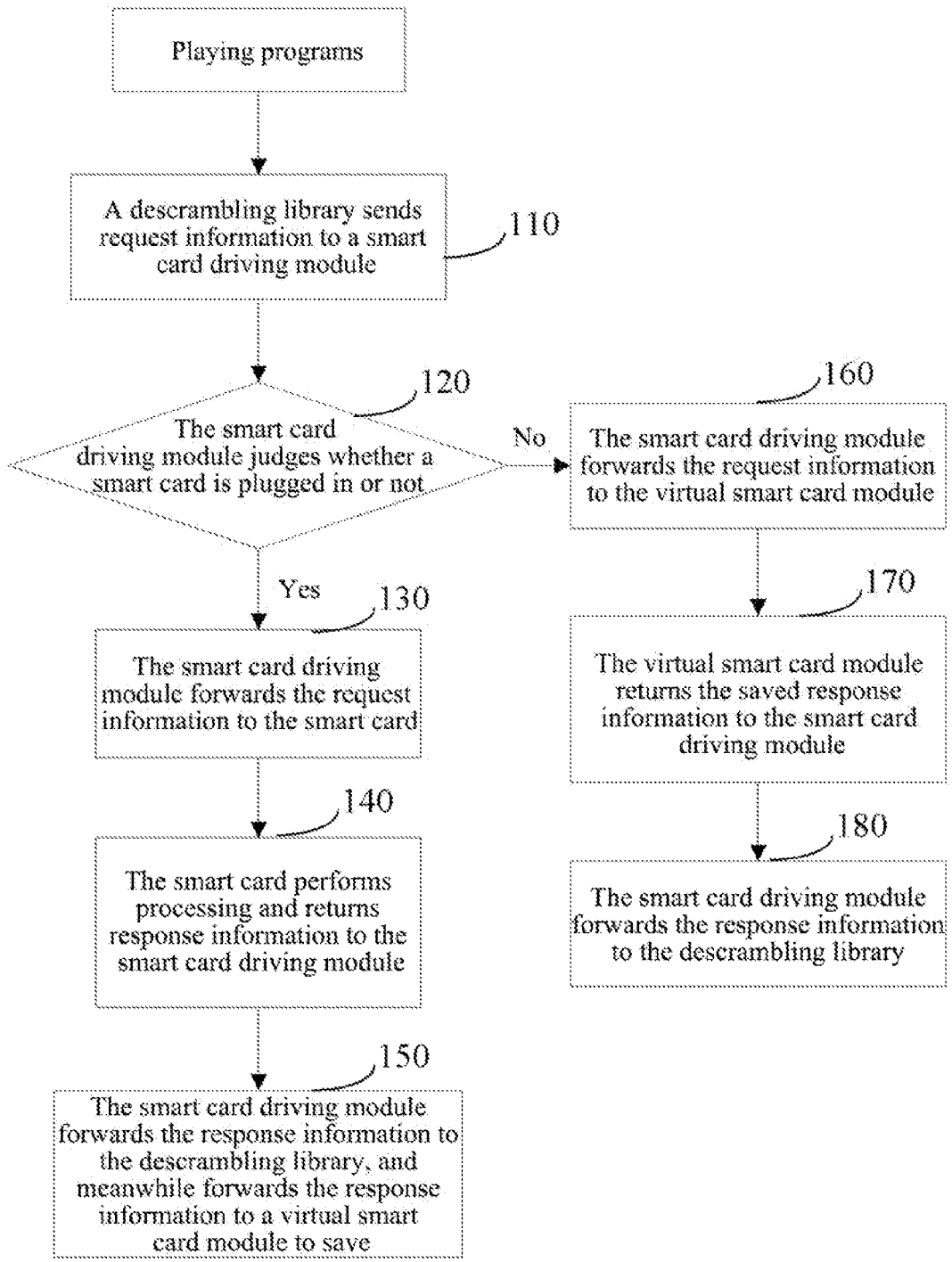
FIG. 3 is a flow diagram of the implementation when a smart card is plugged in or pulled out according to the embodiment of the present invention.

When programs are played, when the descrambling library 204 just receives the encrypted code stream and the program key becomes invalid, the descrambling library 204 will send information for obtaining the program key once or multiple times to the smart card driving module, and try to interact with the smart card to acquire the program key. In the context, information to be sent by the descrambling library to the smart card is called as the request information, and information returned by the smart card to the descrambling library is called as the response information. The processing after the smart card driving module 205 receives the request information each time is as shown in FIG. 3, which comprises the following steps.

In step 110, a smart card driving module 205 receives request information for obtaining a program key sent by a descrambling library 204.

In step 120, the smart card driving module 205 judges whether a smart card 204 is in a plug-in state or a pull-out state, if it is in the plug-in state, step 130 is executed, and if it is in the pull-out state, step 160 is executed.

In step 130, the smart card driving module 205 forwards the request information for obtaining the program key to the smart card 206.

In step 140, the smart card 206 performs processing after receiving the request information, and returns response information to the smart card driving module 205.

In step 150, after receiving the response information of the smart card 206, the smart card driving module 205 forwards the response information to the descrambling library 204, and meanwhile forwards the response information to the virtual smart card module 207 to save, and the processing of this time ends.

In step 160, the smart card driving module 205 forwards the request information to the virtual smart card module 207.

In step 170, the virtual smart card module 207 returns the saved response information to the smart card driving module 205 after receiving the request information.

In step 180, after receiving the response information returned by the virtual smart card module 207, the smart card driving module 205 forwards the response information to the descrambling library 204, and the processing of this time ends.

The descrambling library 204 obtains the program key according to the received response information, if the program key is valid, then it descrambles an encrypted code stream into a clear stream to implement playing; and if the program key is invalid, then it fails to perform correct descrambling and playing, but it also will not perform a deadlock.

Based on the above embodiments, the present invention also can have other transformation modes.

For example, the present invention is not limited to applying to the process for playing mobile multimedia programs, in other processes for playing the mobile multimedia, if the descrambling library needs to interact with the smart card to acquire the key, and performs a deadlock when not receiving a response, the above method of the present invention also can be used.

For another example, in another embodiment, the smart card driving module can detect the state of the smart card after receiving the request information, and judge whether the smart card is in the plug-in state or pull-out state according to a detection result of this time, without detecting the state of the smart card in real time and recording.

The present invention can have various modifications and changes or can be applied to other services with similar problems for the skilled in the art. All the modifications, equivalent alternatives, and improvements, etc. made within the spirit and principle of the present invention shall fall into the scope of claims of the present invention.

Industrial Applicability

In the present invention, the descrambling library is prevented from deadlocking by sending the saved response information of the smart card to the descrambling library, so as to implement the purpose of hot-plug of the smart card which does not require to restart the terminal after the user plugs in the smart card again.

What is claimed is:

1. A method for implementing hot-plug, wherein, the method is applied to a terminal comprising a descrambling library, a smart card driving module, a smart card and a virtual smart card module, and the method comprising:
during a process of playing mobile multimedia, the descrambling library sending request information for obtaining a program key to the smart card driving module, and the smart card driving module determining whether the smart card is in a plug-in state or a pull-out state after receiving the request information for obtaining the program key:
when the smart card is in the plug-in state, the smart card driving module forwarding the request information to the smart card, receiving response information returned by the smart card, forwarding the response information to the descrambling library, and meanwhile forwarding the response information to the virtual smart card module to save;
when the smart card is in the pull-out state, the smart card driving module forwarding the request information to the virtual smart card module, the virtual smart card module returning the saved response information to the smart card driving module, and the smart card driving module forwarding the response information to the descrambling library,
after the step of forwarding the response information to the descramblinq library, the method further comprises: the descramblinq library acquiring the program key from the response information and descramblinq an encrypted code stream.

2. The method according to claim 1, wherein:
before the step of judging whether the smart card is in a plug-in state or a pull-out state, the method further comprises: the smart card driving module detecting whether the smart card is in the plug-in state or pull-out state in real time and recording;
the step of judging whether the smart card is in a plug-in state or a pull-out state comprises: after receiving the request information, the smart card driving module judging whether the smart card is in the plug-in state or pull-out state according to recorded information.

3. The method according to claim 2, wherein:
after the step of the descrambling library sending request information for obtaining a program key to the smart card driving module, the method further comprises: if not receiving the response information of the request information for obtaining the program key, the descrambling library performing a deadlock;
after the step of forwarding the response information to the descrambling library, the method further comprises: the descrambling library acquiring the program key from the response information and descrambling an encrypted code stream.

4. The method according to claim 2, wherein:
after the step of the smart card driving module forwarding the request information to the virtual smart card module, the method further comprises: after the virtual smart card module receives the response information forwarded by the smart card driving module, if the virtual smart card module has not saved any response information, saving the response information, and if response information has already been saved in local, updating the originally saved response information.

5. The method according to claim 1, wherein:
after the step of the descrambling library sending request information for obtaining a program key to the smart card driving module, the method further comprises: if not receiving the response information of the request information for obtaining the program key, the descrambling library performing a deadlock.

6. The method according to claim 1, wherein:
after the step of the smart card driving module forwarding the request information to the virtual smart card module, the method further comprises: after the virtual smart card module receives the response information forwarded by the smart card driving module, if the virtual smart card module has not saved any response information, saving the response information, and if response information has already been saved in local, updating the originally saved response information.

7. The method according to claim 1, wherein:
the method is applied to a playing process of the terminal playing China Mobile Multimedia Broadcasting (CMMB) programs.

8. A terminal supporting hot-plug, comprising a descrambling library, a smart card driving module, a smart card and a virtual smart card module, wherein:
the descrambling library is configured to: send request information for obtaining a program key to the smart card driving module, receive response information sent by the smart card driving module to obtain the program key, and descramble an encrypted code scream;
the smart card driving module is configured to: after receiving the request information for obtaining the program key sent by the descrambling library, determine whether the smart card is in a plug-in state or a pull-out state, when the smart card is in the plug-in state, forward the request information to the smart card, forward the response information returned by the smart card to the descrambling library, and meanwhile forward the response information returned by the smart card to the virtual smart card module to save;

when the smart card is in the pull-out state, forward the request information to the virtual smart card module, and forward the response information returned by the virtual smart card module to the descrambling library; and the virtual smart card module is configured to: after receiving the response information forwarded by the smart card driving module, save or update the response information, and after receiving the request information forwarded by the smart card driving module, return the saved response information to the smart card driving module, after said smart card driving module forwarding the response information to the descramblinq library, the descramblinq library acquiring the program key from the response information and descramblinq an encrypted code stream.

9. The terminal according to claim 8, wherein:

the smart card driving module is further configured to: detect whether the smart card is in the plug-in state or pull-out state in real time and record; and the smart card driving module is configured to judge whether the smart card is in the plug-in state or pull-out state according to recorded information.

10. The terminal according to claim 9, wherein:

the descrambling library is further configured to: after sending the request information for obtaining the program key, perform a deadlock if the response information is not received.

11. The terminal according to claim 8, wherein:

the descrambling library is further configured to: after sending the request information for obtaining the program key, perform a deadlock if the response information is not received.

12. The terminal according to claim 8, wherein:

the descrambling library is further configured to: send the request information for obtaining the program key during a playing process of the terminal playing China Mobile Multimedia Broadcasting (CMMB) programs.

* * * * *